United States Patent [19]

Dietrich, Sr. et al.

[11] Patent Number: 4,596,199
[45] Date of Patent: Jun. 24, 1986

[54] SINGLE BLADE SEALER FOR FERTILIZER APPLICATOR

[75] Inventors: William J. Dietrich, Sr., Congerville; Dean A. Knobloch, Goodfield; Cary L. Sizelove, Eureka, all of Ill.

[73] Assignee: DMI, Inc., Goodfield, Ill.

[21] Appl. No.: 524,905

[22] Filed: Aug. 22, 1983

[51] Int. Cl.⁴ .............................................. A01C 7/02
[52] U.S. Cl. ............................................................ 111/7
[58] Field of Search ................ 172/537–539, 172/569, 570, 572, 602–604, 574, 573, 555, 551; 111/7, 85, 86

[56] References Cited

U.S. PATENT DOCUMENTS

| | | | |
|---|---|---|---|
| 358,246 | 2/1887 | Arnett | 172/604 |
| 516,067 | 3/1894 | Trotter | 111/85 X |
| 530,962 | 12/1894 | Packham | 111/85 |
| 536,094 | 3/1895 | Newton | 172/604 |
| 672,536 | 4/1901 | Newton | 172/604 |
| 882,353 | 3/1908 | Spiers | 172/604 |
| 1,084,307 | 1/1914 | Altgelt | 111/85 X |
| 1,158,110 | 10/1915 | Cook | 172/604 X |
| 2,493,649 | 1/1950 | Alloway | 172/572 |
| 2,746,371 | 5/1956 | Cods | 172/604 |
| 3,306,240 | 2/1967 | Ritchie | 111/6 |
| 4,213,505 | 7/1980 | Jolley | 172/705 X |

FOREIGN PATENT DOCUMENTS

| | | | |
|---|---|---|---|
| 832431 | 4/1960 | United Kingdom | 172/604 |
| 715041 | 2/1980 | U.S.S.R. | 172/604 |

Primary Examiner—Robert A. Hafer
Assistant Examiner—Danton DeMille
Attorney, Agent, or Firm—Emrich & Dithmar

[57] ABSTRACT

A single disc sealer for closing the groove formed by a fertilizer knife is mounted behind the applicator with its cutting edge working immediately adjacent the groove. The work surface has formed in it a raised annular deflection surface spaced inwardly of the periphery of the disc a distance approximately equal to the working depth of the disc. The edge of the disc cuts a ribbon of soil adjacent the furrow, the periphery working surface of the disc displaces the soil laterally toward the groove to close it, and the deflection surface directs the soil down into the furrow rather than lifting the soil as in the case of conventional disc covers, while slightly compacting the soil. The disc mount includes a spring for cushioning the disc and slotted brackets for adjusting the working angle of the disc and its spacing from the fertilizer furrow.

20 Claims, 5 Drawing Figures

SINGLE BLADE SEALER FOR FERTILIZER APPLICATOR

FIELD OF THE INVENTION

The present invention relates to fertilizer applicators of the type used in the agricultural industry for applying various fertilizers, either in liquid form such as anhydrous ammonia or in solid or particulate form. More particularly, the present invention is directed to an effective and economical device for sealing the furrow or groove behind a fertilizer applicator knife using a single unique disc. In this context, the term "sealing" refers to filling in the groove formed by the applicator knife with soil and, for the present invention, at least partially compacting the soil to prevent the escape of anhydrous ammonia deposited at the base of the groove.

BACKGROUND OF THE INVENTION

It is well known that nitrogen is an essential ingredient of crop fertilizer. It may be applied to the soil in a number of different forms. One common form, widely used in the cornbelt states, is anhydrous ammonia. For economy of materials handling, due to the bulk of material involved, a practice has grown of applying anhydrous ammonia in undiluted form (82% N) in bands or ribbons beneath the soil and then covering the fertilizer to prevent its escape.

Typically, a "knife" in the form of a shank having a width of approximately ¾ in. for forming a narrow groove having a depth of approximately 6-8 inches. A complete apparatus for applying anhydrous ammonia will normally include a number of such individual applicators or knives attached to a large frame. The frame may extend to cover a swath 12 to 40 feet in width, with individual applicator knives being typically spaced in the range of 18-30 inches. A tube is located behind the knife and extends down to provide a discharge orifice for the anhydrous ammonia in liquid form at the heel of the knife.

Various types of covering or "sealing" devices are used to fill the groove or furrow formed by the knife to prevent the escape of the ammonia gas.

One conventional sealing mechanism is a called a "paddle cover". It includes two blades spaced about 8-10 inches apart. Each blade has a general teardrop shape and is curved outwardly and thence inwardly to form converging surfaces centered on the groove formed by the applicator knife. The paddle covers gather soil from the side of the groove and scoop it laterally toward the groove to cover it. The paddle cover is effective where the soil is free from trash or debris, for example, in a field which has been plowed with a moldboard plow previously. A paddle cover does not work as well in a field where conservation tillage is practiced, and it is least effective where minimum tillage or no tillage practices are employed.

Another type of covering device is a double disc sealer which includes two curved blades (generally forming a portion of a sphere or cone) located approximately 10-12 inches apart, and again straddling the applicator groove. The axis of these blades is moved slightly upwardly from the horizontal and slightly forwardly so that the blades are at an acute angle relative to the direction of travel. The blades gather soil, lift it and throw the soil toward the opposing blade. The soil from each blade collides with the soil from the other, and this action, together with the general lifting and throwing action of the blades causes sufficient soil to be thrown in to cover the ammonia deposited at the base of the groove formed by the applicator knife.

The double disc sealer works very well in most soil conditions, but in cloddy fields or fields on which conservation tillage has been employed (leaving root crowns and large corn stalks), the blades, which are pivotally mounted and urged downwardly only under gravity in the usual course, are lifted above the surface of the ground when they engage tough trash, thereby leaving portions in which the fertilizer is not adequately covered in the groove. Twin disc sealers are more effective under most field conditions than the paddle cover, but they are also more expensive to manufacture.

SUMMARY OF THE INVENTION

The present invention includes a single disc sealer which is mounted behind the applicator knife with its axis extending downwardly from the horizontal approximately 30° and forwardly of a line transverse of the direction of travel approximately 10°-15°. The disc has a sharpened edge for cutting the soil and a convex work surface.

The work surface has formed in it a raised annular rib, which may simply be formed by stamping. The rib is spaced inwardly of the periphery of the disc a distance approximately equal to the working depth of the disc (i.e., radially inward of the work surface) so that the actual work surface of the disc is a surface of revolution in the form of a "C" having smooth conformation between a lower, generally upright portion which closes the groove wall and an upper, generally horizontal portion which directs loose soil over and into the groove. In operation, the disc is placed closer to the groove than conventional twin disc sealers described above. Typically, the point at which a disc of a twin disc sealer enters the soil will be spaced about 5-6 inches from the center of the groove formed by the applicator knive (a 12 in. spacing between two opposing discs), whereas the disc of the present invention enters the soil approximately 2-3 inches from the center of the furrow, crosses over and breaks down the adjacent furrow wall, and exits the soil in the region above or immediately adjacent to the other side of the furrow. It works in the berm formed by the knife adjacent the groove, whereas both conventional twin disc sealers and paddle covers work in previously undisturbed soil.

As the edge of the disc cuts a ribbon of soil adjacent the furrow, the peripheral work surface of the disc and its working angle cause the soil to be displaced laterally toward the groove formed by the applicator knife. Because of the downward inclination of the axis of the blade, the cutting periphery of the disc is spaced slightly to the side of the groove at the point where the disc enters the soil. The disc preferably works in the region of the berm formed by the applicator knife. The working angle of the disc causes the disc to cut a ribbon of soil immediately adjacent the groove and to move it laterally toward the groove where it falls into the groove to cover the ammonia. Unlike conventional spherical or conical discs, the raised surface of the disc of the present invention cooperates with the disposition of the disc to deflect the soil displaced by the disc down into the groove, preferably slightly compacting it. The trailing edge of the disc leaves the soil generally above or slightly adjacent the side of the groove.

The disc sealer of the present invention preferably is mounted by a structure which permits its working angle to be adjusted and also permits lateral adjustment of the disc relative to the groove or furrow. Further, the mounting mechanism includes a spring for cushioning the disc. The downward force of the spring may be adjusted for different soil conditions, or the spring force may be eliminated entirely if desired. The apparatus includes a convenient, easy and reliable mount directly to an applicator shank with only two bolts. Convenience of mounting and adjustment are considered important operational features in a furrow sealer of this type, particularly when it is appreciated that there may be as many as 25 or more such sealers on a large applicator, all of which may have to be adjusted. It will be appreciated that many such large applicators are owned and operated by independent contractors, working on a fee basis for many different farmers, so it is important to be able quickly and conveniently to adjust the shanks for widely varying field conditions and farming practices by the individual farmer-customers. Such adjustments may have to be made on a daily basis.

The present invention thus provides a novel disc for closing and sealing a groove or furrow such as that formed by a fertilizer applicator knife or shank by providing an unique structure which operates in a novel manner which at least partly compacts the soil in the groove while, at the same time, providing quick and easy adjustment of the working angle as well as the horizontal tilt of the axis of the blade. The single disc closer of the present invention provides improved results over a wide range of soil conditions and tillage practices on the part of the individual farmer. It is particularly advantageous in minimum tillage practice or fields with high trash levels because there is only one disc used so no trash clearance problem is present and because the rolling structure of a disc tends not to collect trash in operation. The invention also includes a spring cushion feature which itself is easily adjusted to suit the desire of a particular user or condition.

Other features and advantages of the present invention will be apparent to persons skilled in the art from the following detailed description of a preferred embodiment accompanied by the attached drawing wherein identical reference numerals will refer to like parts in the various views.

DETAILED DESCRIPTION OF THE PREFERRED EMBODIMENT

Figure 1:
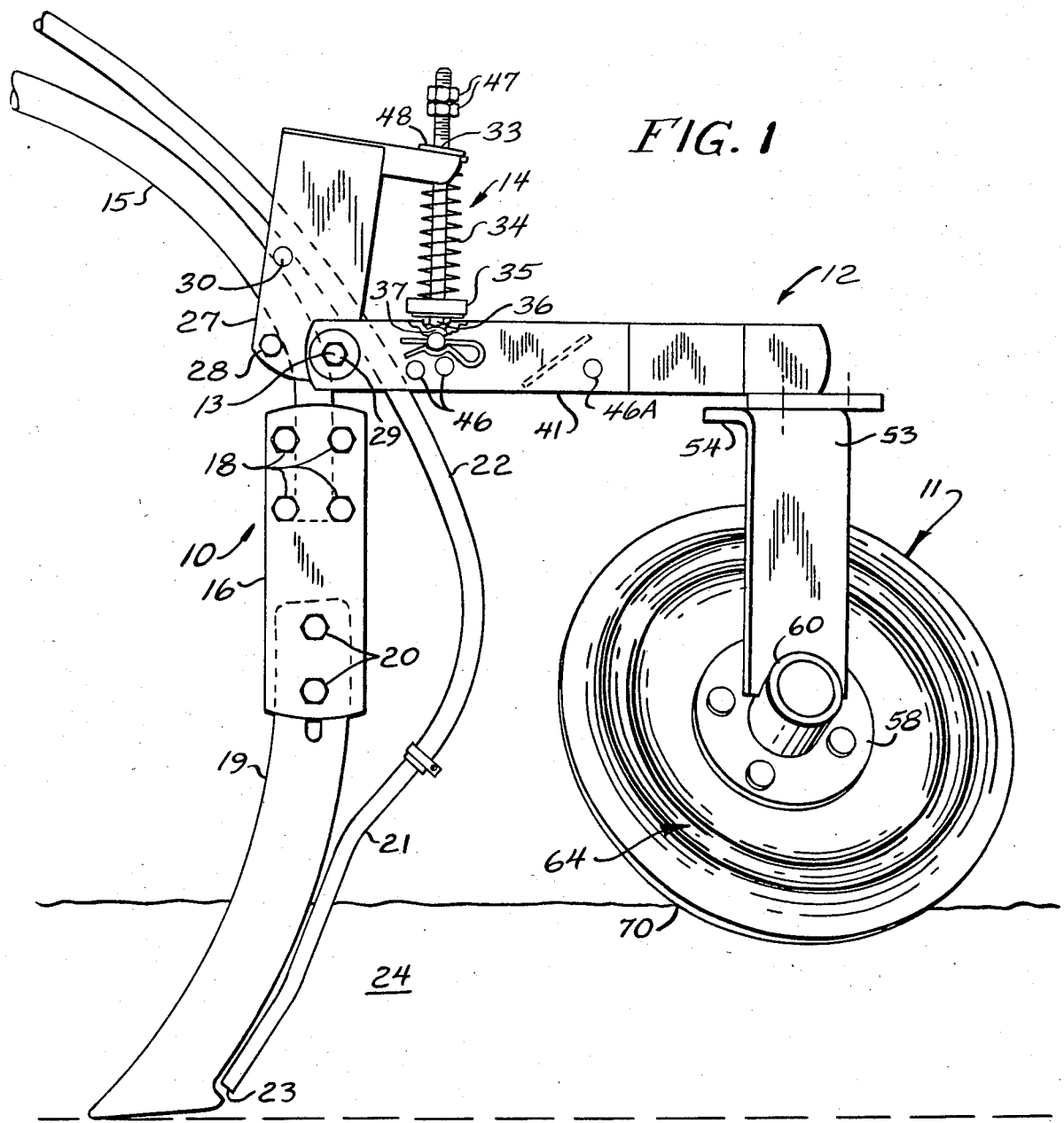
FIG. 1 is a left side elevational view of an applicator knife with the improved spring cushion disc sealer.
Figure 2:
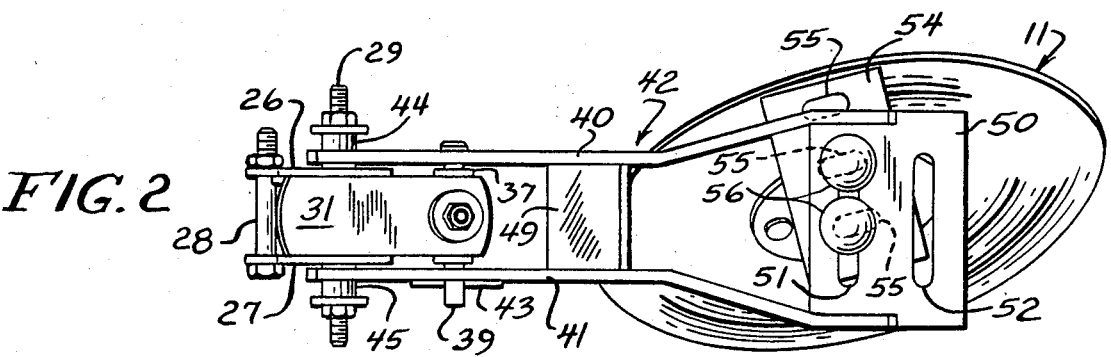
FIG. 2 is a plan view of the apparatus of FIG. 1 with the shank and hose omitted.

Referring first to FIGS. 1 and 2, reference numeral 10 generally designates a fertilizer applicator for forming a groove or furrow in which anhydrous ammonia, in the illustrated embodiment, is deposited. A sealing disc generally designated 11 is mounted by means of a mounting assembly generally designated 12 to trail behind the applicator 10. The mounting assembly 12 and disc 11 are free to rotate about an axis 13, and a spring assembly generally designated 14 urges the disc 11 into working relation with the ground.

The applicator 10 is of conventional design. It includes a curved spring shank 15 to the bottom of which are mounted a pair of plates, one of which is designated 16 in FIG. 1, by means of bolts 18. A knife 19 is secured between the plates 16 by bolts 20. A tube 21 is welded to the rear of the knife 19, and anhydrous ammonia is fed to the applicator tube 21 by means of a flexible hose 22 which is clamped to the upper end of the tube 21. The lower end of the applicator tube 21 provides a discharge orifice 23 at which the anhydrous ammonia is released and deposited in the base of a furrow generally designated 24 which is formed by the knife 19.

Typically, a plurality of applicator knives similar in structure to that just described are mounted by means of their spring shanks to a frame at desired lateral spacings. Such spacings may range from 18 inches to 30 inches or more depending upon the farming practices of the operator. The frame may be either mounted directly to the three-point hitch of the tractor or it may be of the drawn type, having its own support wheels. Wider machines normally have provisions for folding the wings for transport.

Turning now to the mounting assembly 12, it includes a pair of side mounting plates 26, 27 (see FIG. 2) which are spaced apart and engage opposite sides of the shank 15. The plates 26, 27 are secured together by a forward bolt 28 and a rear bolt 29 which forms the base of a pivot assembly which defines the previously mentioned pivot axis 13. The bolts 28, 29 are located respectively forwardly and rearwardly of the shank 15. One or both of the plates 26, 27 may be provided with a detent (see the detent 30 for the plate 27 in FIG. 1) which cooperates with the mounting bolts 28, 29 to hold the mounting plates 26, 27, and hence the entire mounting assembly 12, to the applicator shank 15.

An inverted channel member 31 is welded to the top of the plates 26, 27 and extends rearwardly and generally downwardly thereof to provide a mount for the spring cushion assembly 14. Specifically, the rear portion of the horizontal web of the channel 31 is apertured to receive a spring retaining bolt 33 which extends downwardly through the center of a coil spring 34, the bottom of which is received in a cup washer 35. The head of the bolt 33 is designated 36 in FIG. 1, and its lower surface has welded to it a sleeve or bushing 37 which extends transverse of the direction of travel of the implement and receives a pin 39. The pin 39, in turn, is received in a pair of aligned apertures formed in the side members 40, 41 of a yoke generally designated 42, and the pin 39 forms the lower pivot mounting of the spring cushion assembly 14, as will be further explained below. The pin 39 is held in place on one side by the head of the pin, and on the other side by a clip pin 43.

As best seen in FIG. 2, the forward portions of the side members 40, 41 of the yoke 42 are journalled on sleeves or bushings 44, 45 respectively. The sleeves 44, 45, in turn, are received on the bolt 29 and held against the side plates 26, 27 respectively by washers and nuts threaded on the bolt 29. Thus, the yoke 24 is mounted for pivotal motion in a vertical plane about the axis 13. However, the yoke 42 is urged downwardly by means of the spring assembly 14; and the downward force may be adjusted by placing the pin 39 in one of three sets of aligned apertures 46 which are formed in the side members 40, 41.

A fourth aperture 46A is provided for storing the pin 37 in the case where it is not desired to provide a downward bias on the disc 11, and in that configuration, gravity alone produces the downward force in the use position of the disc sealer.

The lower limit position for the disc sealer is defined by a pair of locked nuts 47 received on the spring bolt 33 which engage a washer 48 on top of the channel 31.

The central section of the side members 40, 41 of the yoke 42 are strengthened by a cross brace 49; and the rear portions of those members have welded to their undersides a horizontal plate 50 having a forward transverse slot 51 and a rear transverse slot 52.

Figure 3:
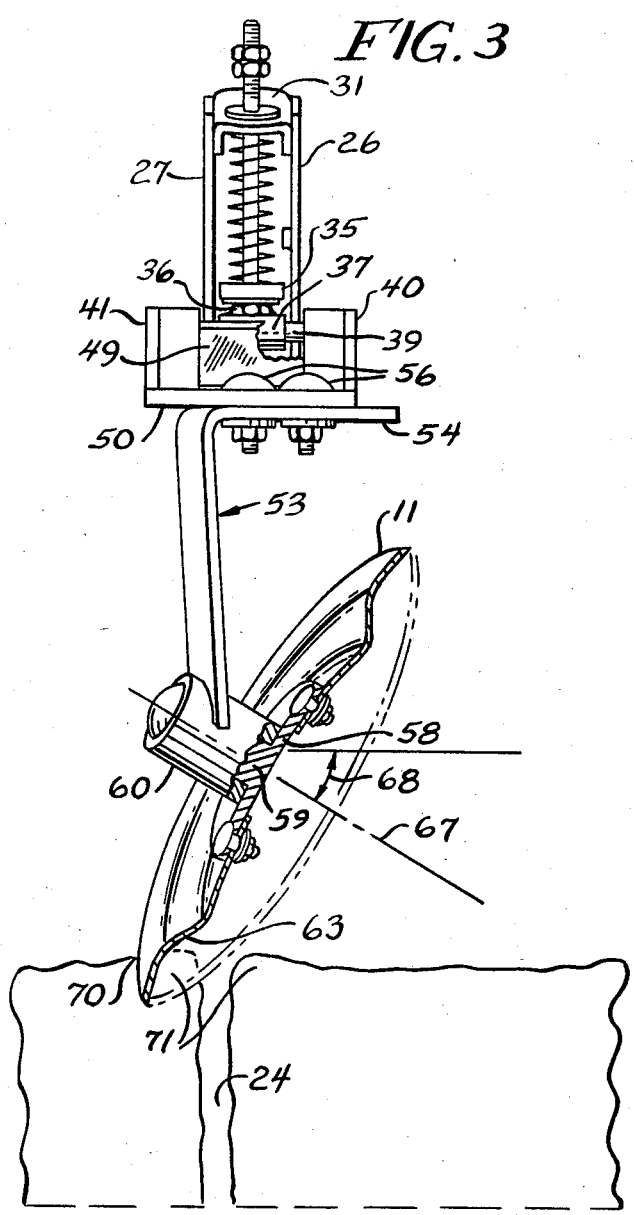
FIG. 3 is a rear view of the apparatus of FIG. 1 with portions of the disc assembly in section.

An angled mounting bracket 53 includes an upper horizontal plate 54 which underlies the slotted plate 50. The plate 54 includes three parallel slots 55 which extend in the general direction of the sealing disc 11 and generally transverse to the slots 51, 52. Two bolts 56 are received in one of the slots 51, 52 and two different ones of the slots 55 for mounting the angle mounting bracket 53 to the yoke 42 as best seen in FIG. 3.

The disc 11 is mounted to a central flange 58 which includes a journal 59 rotatably received in a hub 60. The hub 60 is welded to the bottom of the mounting bracket 53 as seen in FIGS. 1 and 3.

Figure 5:
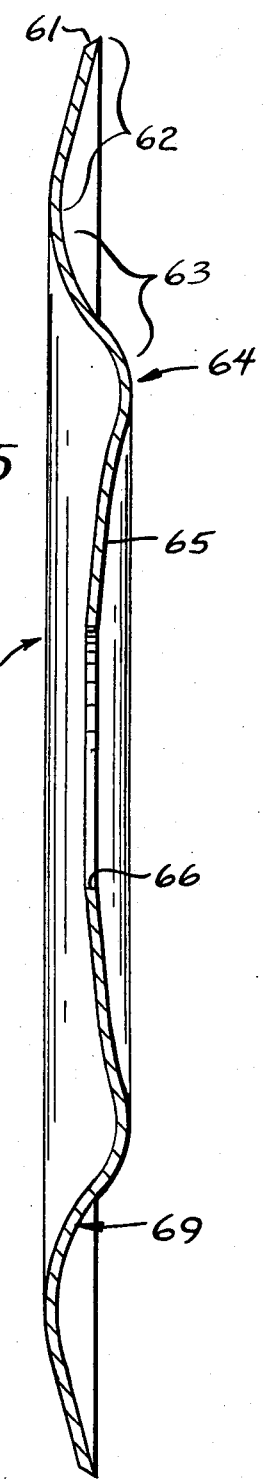
FIG. 5 is a cross-sectional view of the sealing disc taken along a diameter of the disc.

Turning now to FIG. 5, the disc 11 preferably takes the form of a blade having a shapened edge 61. The outermost annular portion of the blade designated in FIG. 5 by the bracketed region 62 conforms to a generally spherical profile of similar conventional concave discs used in the agricultural industry of similar size, although it may also be conical, as persons skilled in the art will appreciate. The function of the annular outer portion 62 of the disc is to cut the soil and displace it laterally to close the furrow or groove. Typically, for closing the groove formed by an ammonia applicator knife, the disc 11 has a diameter of 12-14 in. Inwardly of the annular outer portion 62, the blade is formed inwardly (i.e., toward the center of the sphere) to form a deflecting surface or portion generally indicated in the region of the bracket 63 in FIG. 5. The inner portion of the deflection section 63 is sometimes referred to as a ridge, as illustrated at 64. Inwardly of the ridge 64, the disc is formed into a web 65 which has no function in operation other than supporting the working portions of the disc. The web 65 is apertured at 66 for receiving the mounting flange 58.

It will be understood from observation of FIG. 5 that the closing surface 62 and the deflecting surface 63 are formed in smooth conformation so that no sharp recesses are formed. This provides a self-scouring or cleaning action in use and avoids soil build-up even in moist soil. When proceeding along any radial line from the edge 61 to the center of the disc (e.g., top to bottom in FIG. 5), the closing surface 62 extends to the left in one direction relative to the axis which is parallel to the plane of the page, and then there is a smooth transition and the deflecting surface extends toward the right which is the opposite axial direction.

Turning now to FIG. 3, the axis of rotation of the disc 11 is designated 67, and it preferably forms an angle (indicated by the arrow 68) relative to the horizontal of approximately 25°. This is sometimes referred to as the horizontal tilt angle, and it is not critical to the operation of the unit and is related to the shape of the compacting portion 63 of the disc, as will be understood from a description of the operation of the disc. The axis of rotation 67 also forms an angle of approximately 10°-15° relative to a vertical plane transverse of the direction of travel of the apparatus. That is, the axis of rotation 67 is moved forwardly so that the inner or "work" surface of the disc (designated 69 in FIG. 5) forms a working angle of approximately 10°-15°. The term "working angle" is used commonly in disc plows or the like to refer to the included angle between a plane transverse of the direction of travel of the implement and the axis of rotation of the disc. This assumes, of course, that the axis of rotation of the disc is horizontal, so in the present case, the definition is modified to allow for the horizontal tilt angle of the disc.

Figure 4:
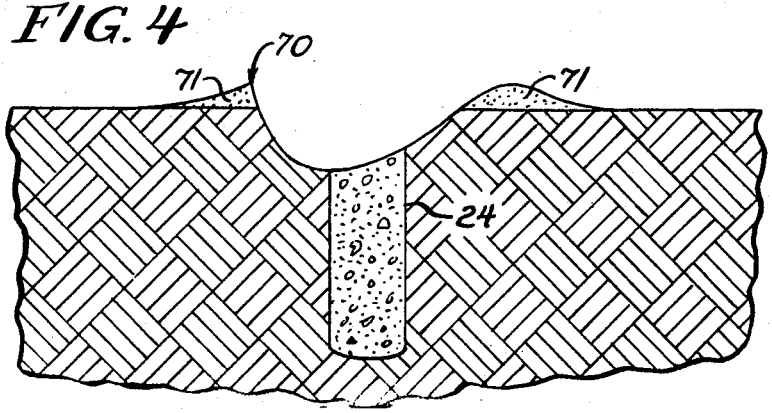
FIG. 4 is a diagrammatic illustration demonstrating a vertical profile of the soil after the disc has closed and sealed the groove.

In operation, the disc enters the soil at the point 70 (see FIGS. 1 and 3); and because of the working angle of the disc, that point on the periphery of the disc will be urged toward the groove or furrow 24 as the apparatus moves forward (to the left in FIG. 1). In other words, as the knife 19 passes through the soil, it forms the groove 24 by pushing soil to the side, thereby causing small berms 71 to be formed on either side of the opening of the groove. As best illustrated in FIG. 4, then, the outer edge of the disc "bites" into the berm 71 on the left side of the groove 24 and cuts partly into undisturbed soil, moving the loose soil and some previously undisturbed soil toward into the groove 24 and breaking down at least the top of the left wall of the groove to fill it by laterally displacing that soil. Cooperatively, the deflecting surface 63 of the disc forces the displaced soil downwardly into the groove slightly compacting the soil. The shape of the deflecting surface 63 is related to the tilt angle of the disc. In the case of a 25° tilt angle, the average angle of the deflecting surface 63 relative to a line perpendicular to the axis of the disc is in the range of 20°-35°. Thus, depending on the shape of the deflecting surface 63, the horizontal tilt angle of the disc may be in the range of 20°-35°.

More important than the actual angle configuration of the deflecting surface 63 is the fact that in the working position, the deflecting surface 63 is located slightly above the surface of the soil; and in operation, it directs the soil downwardly into the groove, rather than throwing the soil outwardly as in the case of a conventional spherical disc.

It will also be observed from FIG. 4 that the location of the disc 11 is such as to at least partially traverse the groove so that the trailing edge of the disc exits the soil in the region generally above or only slightly to the side of the groove itself. This is in contradistinction to the comparatively widely-spaced twin disc sealers known in the art. The final profile left by the single disc sealer is diagrammatically shown in somewhat idealized form in FIG. 4; and it is characterized by a single, rather shallow furrow and reduced berm height, thereby providing a more even final profile than conventional twin disc sealers or paddle covers. Further, because the disc 11 rotates, it has the advantage of performing well at higher speeds and reduces the possibility of accumulating trash; and because of the various structural relationships described above, the operation of the disc sealer of the present invention performs well over a wide range of speeds as well as a wide range of field conditions (from deep plowing to minimum or no-tillage conditions), and a wide range of soil and moisture conditions. The use of only one disc further promotes trash clearance.

Operation in trashy or cloddy conditions is further enhanced by the spring cushion assembly 14 which increases the downward force on the disc 11 and enables quicker reaction in passing over root crowns, heavy trash or the like. As mentioned, the lateral position of the disc sealer may be adjusted within one of the slots 51, 52 (the rear slot being used with an additional fertilizer conduit, for example, for depositing potash) is interposed forward of the tube 21; and the slots 55 may be used to adjust the working angle of the disc. In the latter regard, an increased working angle will provide a greater bite and displace more soil.

Although in FIG. 3, the disc blade is shown on the left side of the groove 24, it can readily be reversed to operate in a similar fashion on the right side of the groove. Thus, if 12 applicators are used on a single frame, six sealers may operate on the left side of the furrow and six on the right side of their respective furrows to provide symmetrical operation and to offset any lateral force caused by the discs.

In summary, the outer periphery of the disc is sharpened to provide a good cutting edge and to achieve a "bite" into the soil. The outer annular portion 62, because of its generally concave shape and the working angle of the disc, gathers soil and displaces it laterally toward the groove to fill the groove at least partially. The deflecting surface 63 directs loose soil from the berm formed by the knife as well as soil loosened and displaced by the annular portion 62 of the blade downwardly into the groove in a slight compacting action. It will be appreciated that in operation, the average angle of the compacting portion 63 is very shallow—approximately 10°-15° above the horizontal so that some compacting is assured at the top of the groove.

Having thus disclosed in detail a preferred embodiment of the invention, persons skilled in the art will be able to modify certain of the structure which has been described and to substitute equivalent elements for those disclosed while continuing to practice the principle of the invention; and it is, therefore, intended that all such modification and substitutions be covered as they are embraced within the spirit and scope of the appended claims.

We claim:

1. In combination with a groove opener, a closer comprising a single rotary disc defining an outer annular closing surface entering the soil immediately adjacent the grooved and inclined at a working angle to displace soil laterally toward said grooved and break down at least the top portion of the nearest wall of said groove, and an annular deflecting surface spaced radially inwardly of said closing surface of said disc and located immediately above the surface of the soil extending laterally toward said groove when said disc is in operation to deflect loosened soil downwardly into said groove, and means for mounting said disc behind said opener to one side of the groove formed thereby at a working angle in the range of approximately 10°-15° and a horizontal tilt angle in the range approximately 20°-35° whereby the outer annular portion of said disc displaces soil laterally toward said groove and said deflecting surface directs displaced soil into said groove.

2. The apparatus of claim 1 wherein said disc defines a peripheral cutting edge and said closing surface extends in smooth conformation to define a raised ridge on the working surface of said disc to provide said deflecting surface.

3. The apparatus of claim 1 wherein said disc is formed from a balde having a cutting edge on the periphery and defining a generally concave closing surface extending inwardly of the cutting edge in annular region for displacing soil laterally toward the groove formed by said opener, and a raised annular ridge adjacent and inwardly of said closing surface, the outermost portion of said ridge defining said deflecting surface.

4. The apparatus of claim 1 wherein said opener comprises a fertilizer applicator and said disc enters the soil adjacent said groove in a region defined by a berm formed by said applicator, and the periphery of said disc crosses the adjacent wall of the groove formed by said applicator in displacing soil into the groove and said disc exits the soil in the region above or immediately adjacent said groove.

5. The apparatus of claim 2 further comprising spring means for urging said disc downwardly into the operating position.

6. The apparatus of claim 5 further comprising means for adjusting the compression force on said spring for a given disposition of said disc.

7. The apparatus of claim 1 wherein said mounting means for said disc includes a generally horizontal frame portion; means for mounting the forward portion of said frame to said opener for rotation about a horizontal axis transverse of the direction of travel of said apparatus; a horizontal mounting plate attached to the rear portion of said frame; said horizontal mounting plate defining laterally elongated mounting slot means; a mounting bracket carrying said disc and including an upper horizontal mounting portion defining elongated slots generally transverse of the slots in said horizontal mounting plate when said disc is in the working position; and fastener means for securing said disc mounting bracket to said horizontal mounting plate by extending through assiciated slots on each of them.

8. The apparatus of claim 7 further comprising first and second vertically extending side plates; bolt means for securing said side plates to the shank of said opener, at least one of said bolts defining the pivot axis for said frame mounting means; a channel member secured to the top of said mounting plates for receiving the upper portion of said spring; a spring bolt extending through said channel portion and coaxial with said spring and extending downwardly through said frame mounting means; a sleeve secured to the bottom of said bolt; and a pin connecting said sleeve to said frame mounting means.

9. The apparatus of claim 8 wherein said frame mounting means provides a plurality of apertures for receiving said pin holding the bottom of said spring assembly for adjusting the preload thereof.

10. In combination with a fertilizer applicator having a shank, a knife mounted to said shank for forming a groove, and conduit means for communicating fertilizer behind said knife to the base of said groove, the improvement comprising: mounting means including a frame pivotally mounted to said shank for permitting said frame to rotate vertically about a pivot axis transverse to the direction of travel; a disc mounted to said frame and located to enter the soil closely adjacent the groove formed by said knife, said disc being inclined at a working angle and displacing soil laterally to break down the upper portion of the adjacent wall of the groove formed by said knife, said disc further having its axis inclined downwardly in the forward direction and defining an outward projecting deflecting surface extending circumferentially about said disc spaced inwardly from the edge thereof at a distance approximately equal to the working depth of said disc and located immediately above the surface of the soil to direct soil displaced by said disc downwardly into the groove behind said knife.

11. The apparatus of claim 10 further comprising spring means for resiliently urging said disc mounting means into the work position.

12. The apparatus of claim 11 further comprising means for adjusting the force on said spring means in the normal position.

13. The apparatus of claim 12 further comprising means for adjusting the working angle of said disc, at least one adjusted position being in the range of 10°-15°.

14. The apparatus of claim 13 wherein the axis of rotation of said disc defines an angle of approximately 30° with the horizontal.

15. The apparatus of claim 14 further comprising means for adjusting the lateral spacing of said disc relative to the groove formed by said knife.

16. Furrow sealing apparatus for use with a fertilizer applicator including a shank and a khife mounted to the bottom of said shank to form a narrow vertical furrow for said fertilizer, comprising: a mounting bracket for mounting to said shank; a frame pivotally mounted to said bracket for rotation in a vertical plane; rotary seal disc means carried by said frame behind said knife and positioned to cover said furrow with soil said disc means including a rotary disc having a generally concave peripheral annular portion for biting into the soil adjacent said furrow and for displacing said soil laterally to break down the top portion of the adjacent wall of said groove, said disc further including an outwardly extending deflecting surface immediately adjacent said concave annular portion thereof located immediately above the surface of the soil and adapted to direct the soil displaced by said annular portion downwardly into said furrow and to compact the same under normal working conditions; and compression spring means mounted between said mounting bracket and said frame to urge said frame downwardly.

17. The apparatus of claim 16 further comprising means for pivotally mounting the base of said spring means to said frame and including means for adjustably setting the force exerted by said spring on said disc means.

18. The apparatus of claim 17 further comprising a mounting bracket carrying said disc and including an upper mounting flange defining a plurality of slots for adjusting the working angle of said disc and for adjusting the lateral location of said disc relative to said furrow.

19. The apparatus of claim 18 wherein said frame further including a horizontal mounting bracket adapted for mounting the bracket of said disc and including slot means elongated transverse of the direction of travel of said disc for further lateral adjustment of the location of said disc relative to said furrow.

20. Apparatus for closing a groove formed by an agricultural tool such as an applicator knife comprising a single disc defining an outer annular closing surface of generally slightly concave shape and extending inwardly of the edge of the disc and an annular deflection surface located inwardly of said closing surface and in smooth conformation therewith; and means for rotatably mounting said single disc to said tool such that in operation said closing surface defines a small working angle, and enters the soil approximately 2-3 inches laterally from the side of said groove, crosses over and breaks down the upper portion of the adjacent top wall of said groove and laterally displaces soil into said groove, and said deflecting surface extends immediately above the surface of the soil to deflect soil loosened by said closing surface downwardly into said groove with a slight compacting action.

* * * * *